Patented Jan. 11, 1944

2,338,876

UNITED STATES PATENT OFFICE 2,338,876

MAGNESIUM COMPOUND FROM CALCINED DOLOMITE

Cyril M. Slansky, Midland, Mich., assignor to The Dow Chemical Company, Midland, Mich., a corporation of Michigan No Drawing. Application August 19, 1942, Serial No. 455,364

8 Claims. (Cl. 23—91)

This invention relates to a method of recovering magnesium compounds from aqueous suspensions of calcined dolomite and other similar mixtures of magnesium hydroxide with calcium hydroxide.

The principal object of the invention is to provide a method of recovering magnesium compounds from calcined dolomite suspensions which achieves in a single stage a high degree of separation of the desired magnesium compounds from the calcium compounds also present in the suspension, and which at the same time forms by-products of considerable value.

The invention is based upon the discovery that certain organic compounds, specifically readily hydrolyzable organic halogen compounds containing one or more labile chlorine, bromine, or iodine atoms, react preferentially with the calcium hydroxide in mixture thereof with magnesium hydroxide, leaving the latter largely unchanged until the calcium hydroxide is substantially all neutralized to soluble calcium halides.

In one form of the invention, calcined dolomite prepared in accordance with conventional procedure is slaked in water to form a fluent slurry. This slurry is then treated under reaction conditions with a neutralizing agent consisting essentially of a readily hydrolyzable organic halogen compound, such agent being added in a proportion approximately equivalent chemically to the calcium hydroxide, thereby preferentially neutralizing the calcium hydroxide and converting it to calcium halide, and simultaneously forming an organic hydrolysis product. The magnesium hydroxide present in the slurry is largely unaffected by the organic halogen compound throughout the treatment, and remains in suspension in the reacted slurry in a readily recoverable form. This suspended magnesium hydroxide is then separated from the reacted slurry by filtration or settling, and is washed to remove soluble impurities, being thus obtained in a concentrated state free of at least the major part of the calcium compounds present in the original calcined dolomite.

The organic hydrolysis product formed during the treatment may be recovered from the reacted slurry, as by distillation or extraction, either prior to or after the separation of the desired magnesium hydroxide, and usually constitutes a valuable by-product of the process.

In so far as is known, any readily hydrolyzable organic halogen compound containing a labile chlorine, bromine, or iodine atom may be used as the neutralizing agent preferentially to dissolve calcium hydroxide away from the magnesium hydroxide in slaked calcined dolomite, or similar mixture. The agent need not be highly purified, but may itself be a crude organic reaction product, e. g., the mixture produced by the halogenation of an organic starting material. Typical compounds which have been found satisfactory are alkyl halides, such as tertiary butyl chloride, alkylene halohydrins, e. g., ethylene chlorohydrin, and halo-aliphatic acids, such as monochloracetic acid. In general, organic chlorine compounds are used because of their greater availability. The alkylene chlorohydrins are especially to be preferred because of their highly preferential and rapid rates of reaction with calcium hydroxide, and because of the fact that their reaction products, olefine oxides, are readily separated from the treated calcined dolomite slurry by distillation.

In one method of carrying out the treatment according to the invention, the calcined dolomite aqueous slurry, which preferably should be adjusted to a solids content of 5 to 25 per cent, is agitated in a closed container and the organic halogen compound neutralizing agent, either per se or in aqueous solution, is introduced slowly until a quantity just sufficient to dissolve the calcium hydroxide present in the slurry has been added. The rate of addition and the temperature of the mixture during treatment are not critical, but should be controlled to provide a relatively rapid rate of dissolution of the calcium hydroxide; the temperature will ordinarily be in the range 30° to 100° C. Following the treatment, the reacted slurry is filtered to remove the desired magnesium hydroxide, and the filter cake is washed to remove soluble impurities. The magnesium hydroxide so prepared is then ready for use. The organic reaction product formed during treatment may be recovered from the reacted slurry before or after filtration, as desired.

The following example will serve to illustrate the invention, but is not to be construed as limiting its scope.

*Example 1*

In a process according to the invention, the magnesium hydroxide-containing slurry treated was derived by slaking calcined dolomite in water, and was found on analysis to contain 12.4 per cent by weight of magnesium hydroxide and 15.8 per cent of calcium hydroxide. The organic halogen compound treating agent employed was a crude aqueous ethylene chlorohydrin derived by the chlorination of ethylene in an aqueous medium, and contained, in addition to water, approximately 9 per cent by weight of ethylene chlorohydrin and a smaller proportion of hydrogen chloride. The calcined dolomite slurry was heated at a temperature of 90°–100° C., and the crude ethylene chlorohydrin was added slowly with agitation in a proportion approximately equivalent chemically to the calcium hydroxide present in the slurry, whereby the latter was converted to soluble calcium chloride. Heating was then continued to distill off the ethylene oxide produced during reaction, the entire addition and distillation requiring about 1.0 hour. The ethylene-oxide-free reacted slurry was then filtered to recover the residual magnesium hydroxide, and the filter cake was washed with water. The product thus separated contained 82.5 per cent by weight of magnesium hydroxide, together with water and a small proportion of calcium compounds, the magnesium hydroxide therein representing 98.4 per cent by weight of the magnesium hydroxide in the initial calcined dolomite slurry.

The invention has thus far been described as relating to the recovery of magnesium hydroxide as such from calcined dolomite slurries. However, in another modification of the invention, the magnesium hydroxide suspension remaining after treatment of the calcined dolomite slurry with an organic halogen compound neutralizing agent may, instead of being filtered to recover the magnesium hydroxide as a final product, be treated to convert the magnesium hydroxide to magnesium halide, which latter is then recovered.

In this form of the invention, the preferential neutralization of the calcium hydroxide content of a slaked dolomite slurry with an organic halogen compound neutralizing agent is carried out as already described in detail, and the organic hydrolysis product is removed by distillation or extraction. Following this removal, the remaining suspension, which consists essentially of magnesium hydroxide precipitate and calcium halide solution, is carbonated in accordance with known procedure by passing in carbon dioxide (or combustion gases containing the same) in a proportion approximately sufficient to convert the magnesium hydroxide to soluble magnesium halide and simultaneously to precipitate an equivalent quantity of calcium carbonate, according to the equation

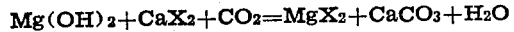

$$Mg(OH)_2 + CaX_2 + CO_2 = MgX_2 + CaCO_3 + H_2O$$

wherein X is chlorine, bromine, or iodine. The precipitated calcium carbonate is then removed by filtration, leaving a clear solution essentially comprising magnesium halide, which latter may be recovered in solid form by evaporation or crystallization.

Other modes of applying the principle of the invention may be employed instead of those explained, change being made as regards the details disclosed, provided the steps recited in any of the following claims or the equivalent thereof be employed.

I claim:

1. In a method of recovering magnesium hydroxide from an aqueous suspension thereof in admixture with calcium hydroxide, the steps which comprise: treating the suspension under reaction conditions with a neutralizing agent consisting essentially of a readily hydrolyzable organic halogen compound containing a labile halogen atom selected from the class consisting of chlorine, bromine, and iodine, the said agent being added in a proportion approximately equivalent chemically to the calcium hydroxide, thereby preferentially dissolving the latter; and recovering the residual magnesium hydroxide precipitate from the reacted suspension.

2. In a method of recovering magnesium hydroxide from an aqueous slurry derived by slaking calcined dolomite in water, the steps which comprise: treating the slurry under reaction conditions with a readily hydrolyzable organic chlorine compound in a proportion approximately equivalent chemically to the calcium hydroxide present in the slurry, thereby preferentially dissolving the said calcium hydroxide, and simultaneously forming an organic reaction product; separating the said reaction product; and recovering the residual magnesium hydroxide from the remaining slurry.

3. A process according to claim 2 wherein the organic chlorine compound is an alkylene chlorohydrin.

4. In a method of recovering magnesium hydroxide from an aqueous slurry derived by slaking calcined dolomite in water, the steps which comprise: treating the slurry under reaction conditions with a neutralizing agent consisting essentially of ethylene chlorohydrin, said agent being added in a proportion approximately equivalent chemically to the calcium hydroxide present in the slurry, thereby preferentially dissolving the said hydroxide as calcium chloride, and simultaneously forming ethylene oxide; distilling the ethylene oxide from the slurry; and separating the residual magnesium hydroxide precipitate from the ethylene oxide-free slurry.

5. In a method of treating an aqueous slurry derived by slaking calcined dolomite in water to recover the magnesium content as magnesium halide, the steps which comprise: treating the slurry under reaction conditions with a neutralizing agent consisting essentially of a readily hydrolyzable organic halogen compound containing a labile halogen atom selected from the class consisting of chlorine, bromine, and iodine, the said agent being added in a proportion approximately equivalent chemically to the calcium hydroxide content of the slurry, thereby preferentially dissolving the said hydroxide, and forming an organic reaction product; separating the latter from the treated slurry; passing carbon dioxide into the residual slurry in a proportion approximately sufficient to convert the magnesium hydroxide to magnesium halide and simultaneously to precipitate an equivalent quantity of calcium carbonate; separating the calcium carbonate from the carbonated slurry; and recovering magnesium halide from the resulting carbonate-free solution.

6. A process according to claim 5 wherein the organic halogen compound is an alkylene chlorohydrin.

7. In a method of removing calcium hydroxide from magnesium hydroxide containing the same, the step which comprises: treating the said magnesium hydroxide in aqueous suspension under reaction conditions with a neutralizing agent consisting essentially of readily hydrolyzable organic compound containing a labile halogen atom selected from the class consisting of a chlorine, bromine, and iodine, the said agent being added in a proportion approximately equivalent chemically to the calcium hydroxide to be removed, whereby the calcium hydroxide is preferentially dissolved, leaving the magnesium hydroxide substantially unreacted and in recoverable form.

8. In a method of removing calcium hydroxide from magnesium hydroxide containing the same, the steps which comprise: treating the said hydroxide in aqueous suspension under reaction conditions with a neutralizing agent consisting essentially of an alkylene chlorohydrin, the said agent being added in a proportion approximately equivalent chemically to the calcium hydroxide to be removed, whereby the calcium hydroxide is preferentially dissolved as calcium halide and an equivalent quantity of an olefine oxide is simultaneously formed; and distilling the olefine oxide from the reacted mixture, leaving the magnesium hydroxide substantially unreacted and in recoverable form.

CYRIL M. SLANSKY.